April 14, 1925.
J. SLEPIAN
1,533,277
MEANS FOR PREVENTING ARMATURE COIL HEATING
Filed Aug. 15, 1919
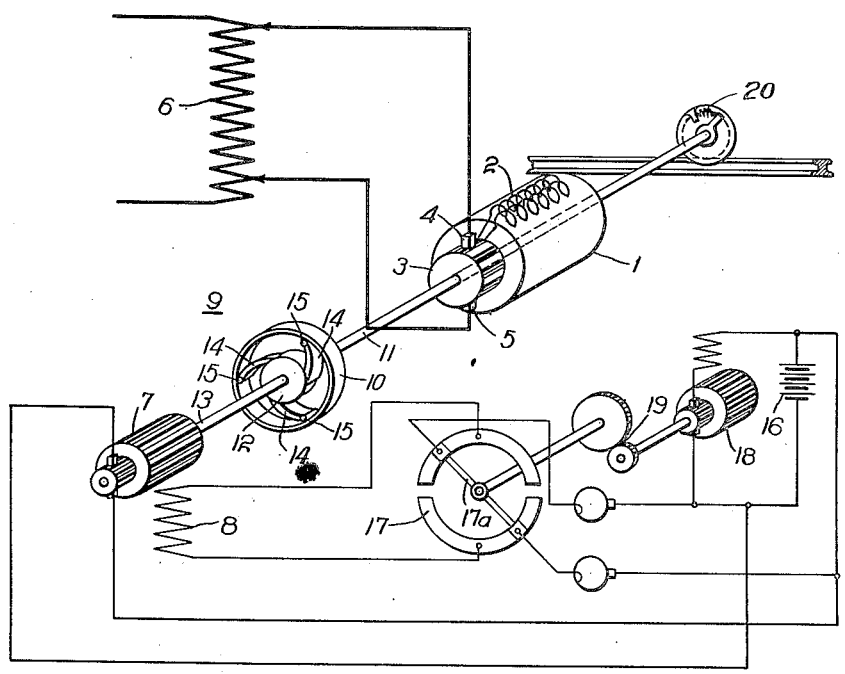
WITNESSES:
H.B.Funk.
A.A.Brand
INVENTOR
Joseph Slepian.
BY
Wesley Carr
ATTORNEY Patented Apr. 14, 1925.

1,533,277

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

MEANS FOR PREVENTING ARMATURE-COIL HEATING.

Application filed August 15, 1919. Serial No. 317,692.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Means for Preventing Armature-Coil Heating, of which the following is a specification.

My invention relates to commutator dynamo-electric machines, and it has for its object to provide means for preventing excessive heating of the short-circuited armature coils in machines of the character designated when they are subjected to full voltage at standstill.

In the operation of single-phase commutator motors for railway purposes, considerable trouble is experienced in meeting the requirements laid down by certain customers, that full torque be given for five minutes at standstill. Various reasons inherent in railway practice dictate this somewhat rigid requirement, and it is, therefore, the object of my invention to admit of the fulfillment of said requirement without subjecting that armature coil, which happens to be short circuited by the brushes in the standstill position, to excessive overheating and perhaps to complete burning out.

The aforementioned object is broadly claimed in the copending application of Charles LeG. Fortescue, filed August 8, 1919, Serial No. 316,089, assigned to the Westinghouse Electric & Manufacturing Company, and describing an organization wherein the stationary member of the motor is rotated during the initial starting period. In my present invention, I accomplish this object by providing means, in connection with dynamo-electric machines of the character described, for moving the armature to and fro through a small angle from its normal position in such manner that no one coil shall be continually short circuited by the brushes while the armature of the machine is not rotating. I find that the system above described is also particularly applicable to the commutator elements of machine aggregates such as are described and claimed in my copending application, Serial No. 317,689, filed August 15, 1919, in which the commutation is performed in one machine and the torque is produced in another machine.

The single figure of the accompanying drawing is a diagrammatic illustration of the various machines employed to practice my invention, they being somewhat enlarged and the system, in general, being somewhat distorted in order to more clearly point out the functions thereof.

A commutator dynamo-electric machine 1 is shown in phantom, in order to illustrate the position of a short circuited coil 2 the ends of which are connected to adjacent segments of a commutator cylinder 3, the coil 2 being short circuited through one of the brushes 4 and 5. A source of energy 6 is utilized to energize the machine 1. It will be understood that, to answer certain requirements, the machine 1 is to be energized with full-load current for five minutes at standstill. An auxiliary dynamo-electric machine 7, provided with a shunt-excited field winding 8, is mechanically and detachably connected to the machine 1 by a clutch 9 comprising a cupped annular portion 10 rigidly secured to a shaft 11 of the machine 1, and an engageable element 12 rigidly secured to a shaft 13 of the machine 7, the clutching action between the elements 10 and 12 being effected by gripping elements 14 which are pivoted to the interior wall of the member 10 and are urged toward the element 12 by springs 15. When the machine 1 attains a certain predetermined speed, the centrifugal force acting upon the members 14 is sufficient to throw them radially away from the member 12, and the machine 1 is, therefore, mechanically detached from the machine 7.

The field winding 8 is adapted to be energized from a source of energy 16, and the direction of such energy flow is varied a predetermined number of times per second through a reversing switch 17 of a well-known type, the rotating arm 17a thereof being actuated by a small auxiliary motor 18 through gears 19.

Having described a system constructed in accordance with my invention, the operation thereof is as follows:

At standstill of whatever vehicle or other load the motor 1 is attached to, the over-running clutch 9 will function to rigidly mechanically connect the shafts 11 and 13 of the motors 1 and 7, respectively. Any suitable switching mechanism, not shown, may be used to so associate the source 6 and the source 16 that, upon the energization of the motor 1 from the source 6, the reversing switch will be started and the motor 7 and its field winding 8 energized. The reversal of energy through the field winding 8 will thereafter cause the motor 7 to oscillate slowly and will, therefore, cause the armature winding of the machine 1 to move in such manner that no one coil will be short circuited for any length of time.

It will be understood that the illustrated rigid connection of the motor to the load is only apparent, and that, in railway practice, a resilient quill drive is usually employed, as indicated at 20, such a connection possessing sufficient flexibility to allow my invention to be used. After the expiration of the required standstill period, the speed of the motor 1 will be such that the clutch 9 will disengage the shaft 13, and the oscillation of the armature winding of the machine 1 will cease.

While I have illustrated but one embodiment of my invention, it is obvious that many modifications therein may occur to those skilled in the art, and I desire, therefore, that the invention be limited only by the prior art or as specified in the appended claims.

I claim as my invention:

1. In combination with a commutator dynamo-electric machine having a stationary member and a normally rotating torque-producing armature winding, oscillating means for moving said armature winding to and fro through a small angle about its normal position whereby no one coil is continuously short circuited.

2. In combination with a dynamo-electric machine embodying a commutated armature winding, an auxiliary motor detachably connected thereto, and means for periodically reversing the direction of rotation of said auxiliary motor.

3. In combination with a dynamo-electric machine embodying a commutated armature winding, an auxiliary motor detachably connected thereto, a mechanical load resiliently connected thereto, and means for reversing the direction of rotation of said auxiliary motor at such speed that the armature of the main machine will be oscillated to and fro through a small angle about its normal position.

4. In combination with a dynamo-electric machine embodying a commutated armature winding, an auxiliary motor, means for detachably connecting the two motors whereby the former may be driven, said means operating to mechanically disconnect the motors when the first-named motor reaches a predetermined speed, and means for reversing the direction of rotation of said auxiliary motor.

5. In combination with a dynamo-electric machine embodying a commutated armature winding, an auxiliary motor provided with a field winding, means for detachably connecting the two motors whereby the former may be driven, said means operating to mechanically disconnect the motors when the first-named motor reaches a predetermined speed, and means for reversing the direction of energization of the field winding of said auxiliary motor.

6. The combination with a load, of a motor resiliently connected thereto and additional means for applying a pulsating torque to said motor while said load is at rest.

7. The combination with an alternating-current commutator motor, of a yieldable load connected thereto, and means for causing a pulsating torque to be applied to said load, said pulsations having such magnitude and frequency that different armature coils of said motor will be successively short-circuited without producing continuous rotation of said load.

8. The combination with a commutator-type dynamo-electric machine having a stationary member and a normally rotating torque-producing member, of torque-transmitting means associated with said torque-producing member, and independent means whereby an additional torque of a pulsating character may be applied to said torque-transmitting means when said torque-producing member is insufficient to overcome the inertia of its load.

9. The method of preventing excessive local armature heating of an electric motor producing torque at standstill which consists in causing the rotatable member to oscillate about a mean position when the torque produced therein is insufficient to rotate said member against its load.

10. The method of operating an alternating-current commutator motor which consists in energizing said motor to produce a torque against a mechanical load and in causing a relative oscillatory movement between the rotor and stator members while said load is stationary.

11. The combination with an alternating-current commutator motor, of a mechanical load resiliently connected thereto, and means for causing a pulsating torque to be applied to said load, said pulsations having such magnitude and frequency that there will be a relative oscillatory movement between the rotor and stator members while said load is stationary.

In testimony whereof, I have hereunto subscribed my name this 30th day of July, 1919.

JOSEPH SLEPIAN.